(12) United States Patent
Nishihara et al.

(10) Patent No.: US 10,156,253 B2
(45) Date of Patent: Dec. 18, 2018

(54) CONNECTING ROD OF ENGINE

(71) Applicant: SUZUKI MOTOR CORPORATION, Hamamatsu-Shi, Shizuoka-Ken (JP)

(72) Inventors: Takashi Nishihara, Hamamatsu (JP); Yuki Tsukamoto, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 166 days.

(21) Appl. No.: 15/224,018

(22) Filed: Jul. 29, 2016

(65) Prior Publication Data
US 2017/0030400 A1 Feb. 2, 2017

(30) Foreign Application Priority Data
Jul. 31, 2015 (JP) .................. 2015-151576

(51) Int. Cl.
F16C 7/00 (2006.01)
F16C 7/02 (2006.01)
F16C 9/00 (2006.01)

(52) U.S. Cl.
CPC ............. *F16C 7/023* (2013.01); *F16C 9/00* (2013.01)

(58) Field of Classification Search
CPC .................... F16C 7/023; F16C 9/00
USPC ...................................... 123/197.3
See application file for complete search history.

(56) References Cited

U.S. PATENT DOCUMENTS

| 4,827,795 | A | * | 5/1989 | Machida | ................. F16C 7/023 123/197.3 |
| 6,055,884 | A | * | 5/2000 | Lantz | .................. B23D 31/003 123/197.3 |
| 2011/0303183 | A1 | * | 12/2011 | Zottin | ....................... F16C 9/04 123/197.3 |
| 2013/0098330 | A1 | * | 4/2013 | Sigrist | ..................... F16C 7/023 123/197.3 |
| 2015/0053169 | A1 | * | 2/2015 | Galli | ...................... F16C 7/023 123/197.3 |

FOREIGN PATENT DOCUMENTS

JP 2000337347 A 12/2000

* cited by examiner

*Primary Examiner* — Marguerite McMahon
(74) *Attorney, Agent, or Firm* — Barnes & Thornburg LLP

(57) ABSTRACT

A engine connecting includes a large diameter end portion mounted to a crank of a crankshaft of an engine to be rotatable, a small diameter end portion into which a piston pin is inserted and which supports the piston pin to be rotatable, and a connecting portion connecting the large diameter end portion and the small diameter end portion at a longitudinal end portions thereof. The connecting portion has a plate-shape widened in a wide width direction thereof to be perpendicular to a center axis of the crank shaft, the connecting portion is provided with four vertical reinforcing portions projecting in four directions so as to extend in a longitudinal direction of the connecting rod from the small diameter end portion to the large diameter end portion.

8 Claims, 9 Drawing Sheets

CONNECTING ROD OF ENGINE

PRIORITY CLAIM

This patent application claims priority to Japanese Patent Application No. 2015-151576, filed 31 Jul. 2015, the disclosure of which is incorporated herein by reference in its entirety.

BACKGROUND OF THE INVENTION

Field of the Invention

The present invention relates to a connecting rod of an engine having light weight and high rigidity, and superior in moldability.

Description of the Related Art

In an engine such as internal combustion engine of a vehicle, a connecting rod is disposed for connecting a piston and a crankshaft, and the connecting rod has one end having a smaller diameter (small diameter end) connected to the piston and the other end having a larger diameter (large diameter end) connected to a portion eccentric from a rotating shaft of the crankshaft so as to transfer combustion expansion force applied to the piston to the crankshaft.

In a conventional engine, rigidity in a bending direction with respect to a load in a longitudinal direction is ensured by forming a connecting rod in shape of H in section by providing a reinforcing rib to the connecting portion of the connecting rod such as disclosed in Patent Document 1 (Japanese Patent Laid-open Publication No. 2000-337347.

In this technical field, as the engine performance has been improved and operated at high speed operation and high power operation, the reciprocal motion of the piston increases, and as a result, load applied to the connecting rod in its longitudinal direction is repeated and vibration in a twisting direction is liable to be caused. In order to suppress such vibration in the twisting direction, it becomes necessary to further provide a rib to the connecting rod so as to extend in a different direction in addition to the reinforcing rib provided in the conventional technology for increasing the rigidity.

However, addition of such reinforcing rib with no specific reason, the weight of the connecting rod is increased, which leads to increasing in inertia force in reciprocating mass. As a result, the output power is lowered, fuel efficiency becomes worse, vibration is increased, and responsiveness becomes worse, thus being inconvenient.

SUMMARY OF THE INVENTION

The present invention was therefore conceived in consideration of the circumstances mentioned above, and an object thereof is to provide a connecting rod of an engine having light weight and superior moldability as well as having high rigidity.

Another object of the present invention is to provide a connecting rod of an engine having a structure capable of suppressing increasing in weight of the connecting rod and improving rigidities in bending and twisting directions by improving arrangement of a reinforcing portion, such as rib member, provided to a connecting portion of the connecting rod.

In order to achieve the above objects, the present invention provides a connecting rod of an engine which is provided with a large diameter end portion mounted to be rotatable to a crank pin of a crankshaft of an engine, a small diameter end portion into which a piston pin is inserted and which supports the piston pin to be rotatable; and a connecting portion connecting the large diameter end portion and the small diameter end portion at a longitudinal end portions thereof, wherein the connecting portion has a plate-shape widened in a width direction thereof to be perpendicular to a center axis of the crank shaft, the connecting portion is provided with four vertical reinforcing portions projecting in four directions so as to extend in a longitudinal direction of the connecting rod from the small diameter end portion to the large diameter end portion, and a plurality of recessed portions are formed so that side surface portions of the connecting portion are recessed with respect to four side lines of a rectangular shape formed by a virtual line connecting four end points of the vertical reinforcing portions connecting the large and small diameter end portions in a sectional view taken by an orthogonal plane of the center axis of the connecting portion.

The connecting portion is also provided with oblique reinforcing portions extending in the longitudinal direction thereof in a manner crossing each other. It may be preferred that the vertical reinforcing portions and the oblique reinforcing portions are formed as rib members.

Accordingly, as described above, in the connecting rod of the engine of the present embodiment, by improving the design in shape or arrangement of the reinforcing portions in form of ribs formed to the side surfaces of the connecting portion of the connecting rod, the rigidities thereof in their bending and twisting directions can be enhanced, and hence, the connecting rod having light weight and high rigidity can be provided as well as achieving high speed operation and high power operation.

DESCRIPTION OF THE PREFERRED EMBODIMENT

An embodiment of the present invention will be described hereinafter with reference to the accompanying drawings.

It is further to be noted that terms "right and left", "upper and lower", and like terms indicating directions are used herein with reference to the drawings.

Figure 1:
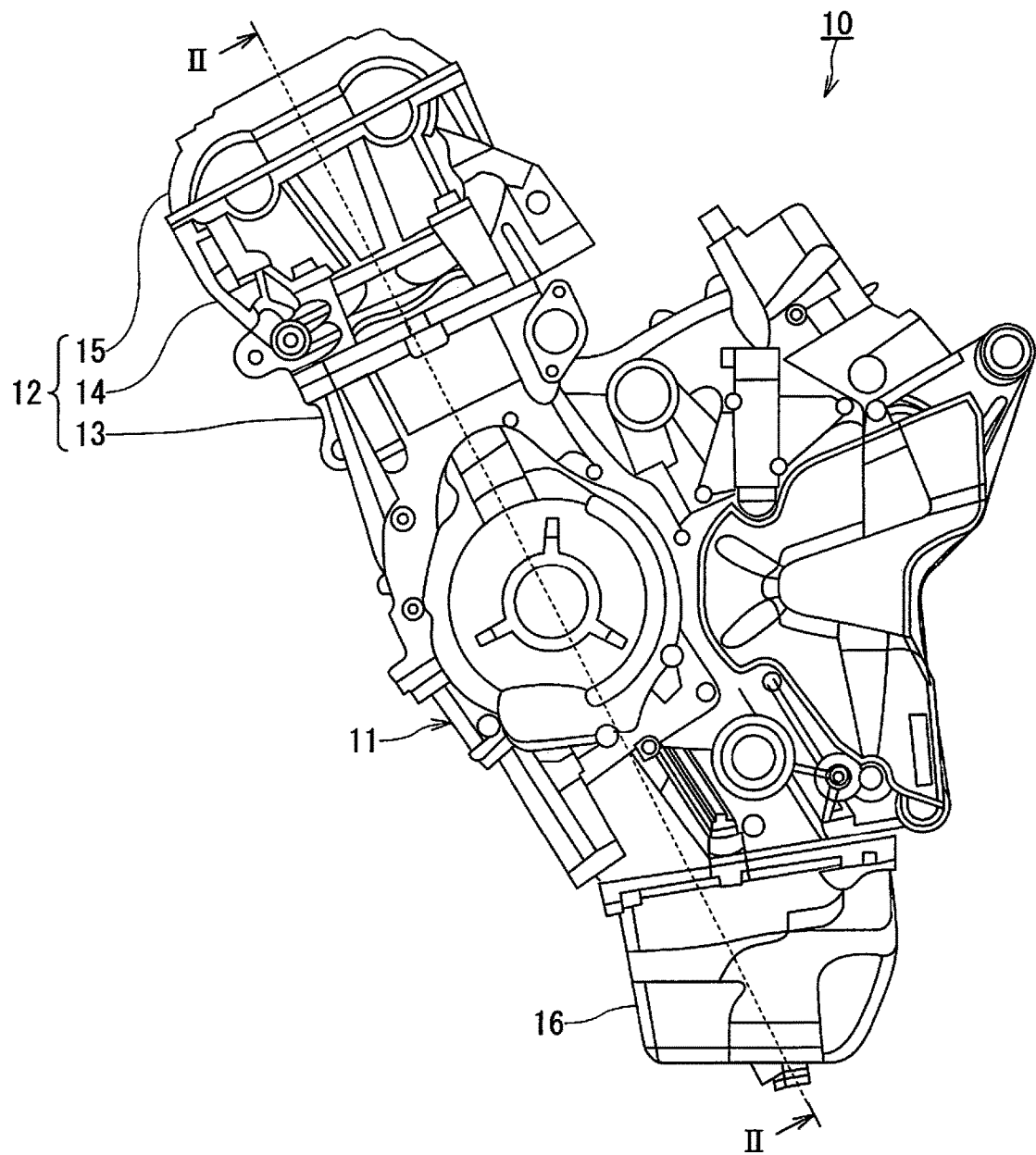
FIG. 1 is a side view of an engine mounted to a vehicle body frame of a motorcycle, to which a connecting rod of an engine is applicable.

FIG. 1 is a side view of an engine 10, as an internal combustion engine, mounted to a vehicle body frame of a motorcycle. The engine 10 includes a crankcase 11 and a cylinder assembly 12 installed above the crankcase 11. The cylinder assembly 12 is integrally assembled with a cylinder block 13, a cylinder head 14, and a head cover 15 which are stacked in order. In FIG. 1, reference numeral 16 denotes an oil pan storing lubrication oil.

Figure 2:
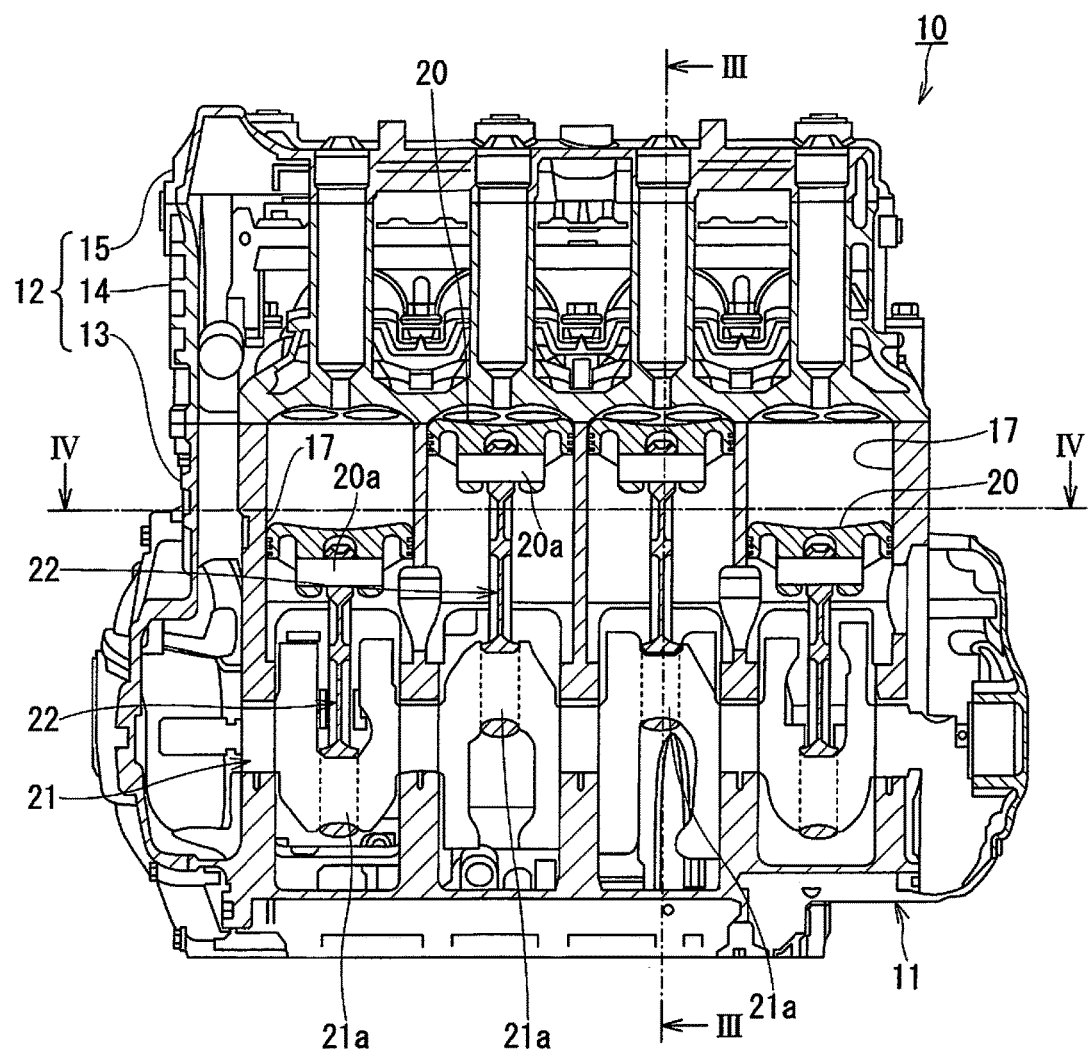
FIG. 2 is a vertical sectional view taken along the line II-II in FIG. 1.
Figure 3:
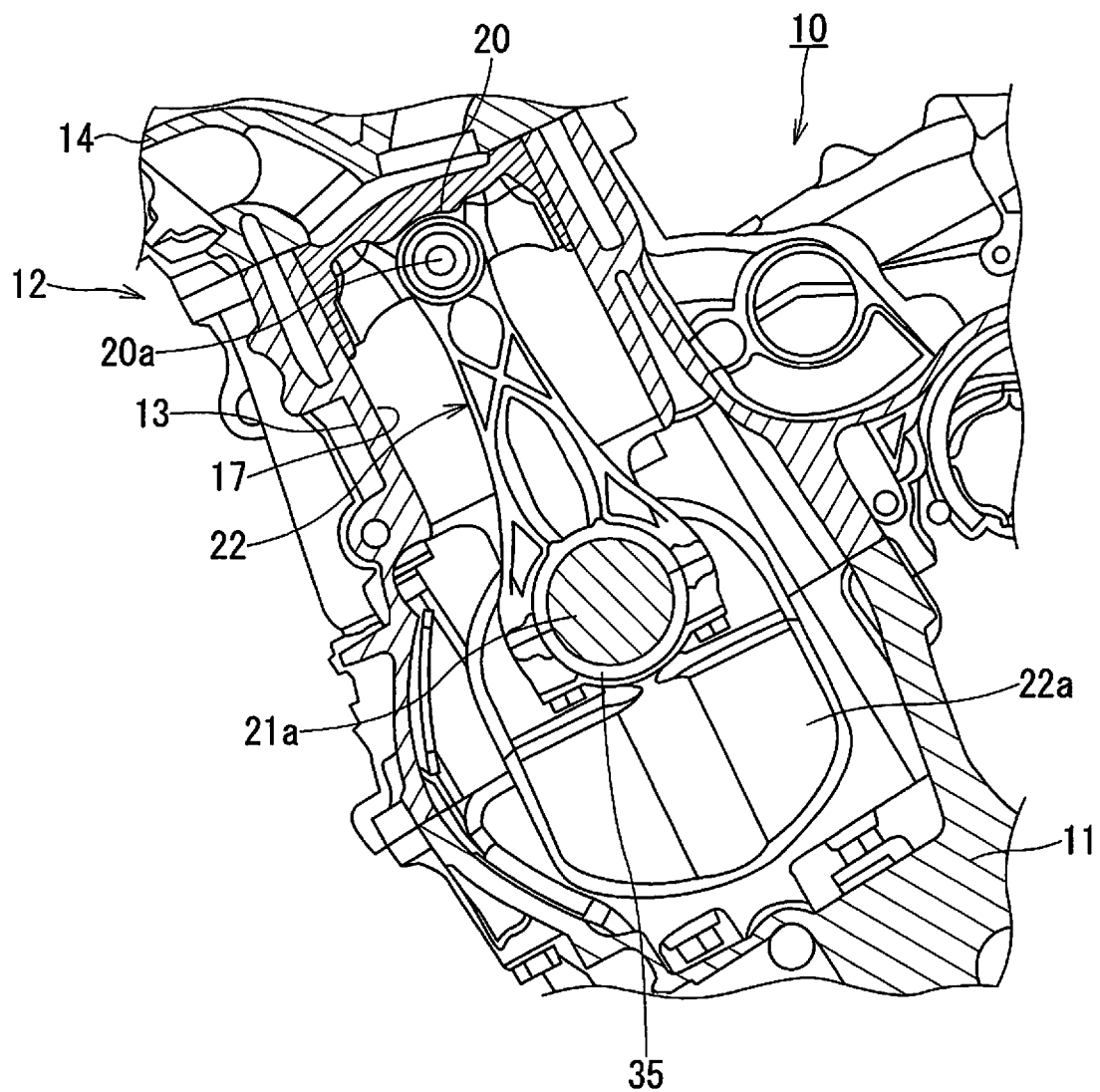
FIG. 3 is a side sectional view taken along the line III-III in FIG. 2.
Figure 4:
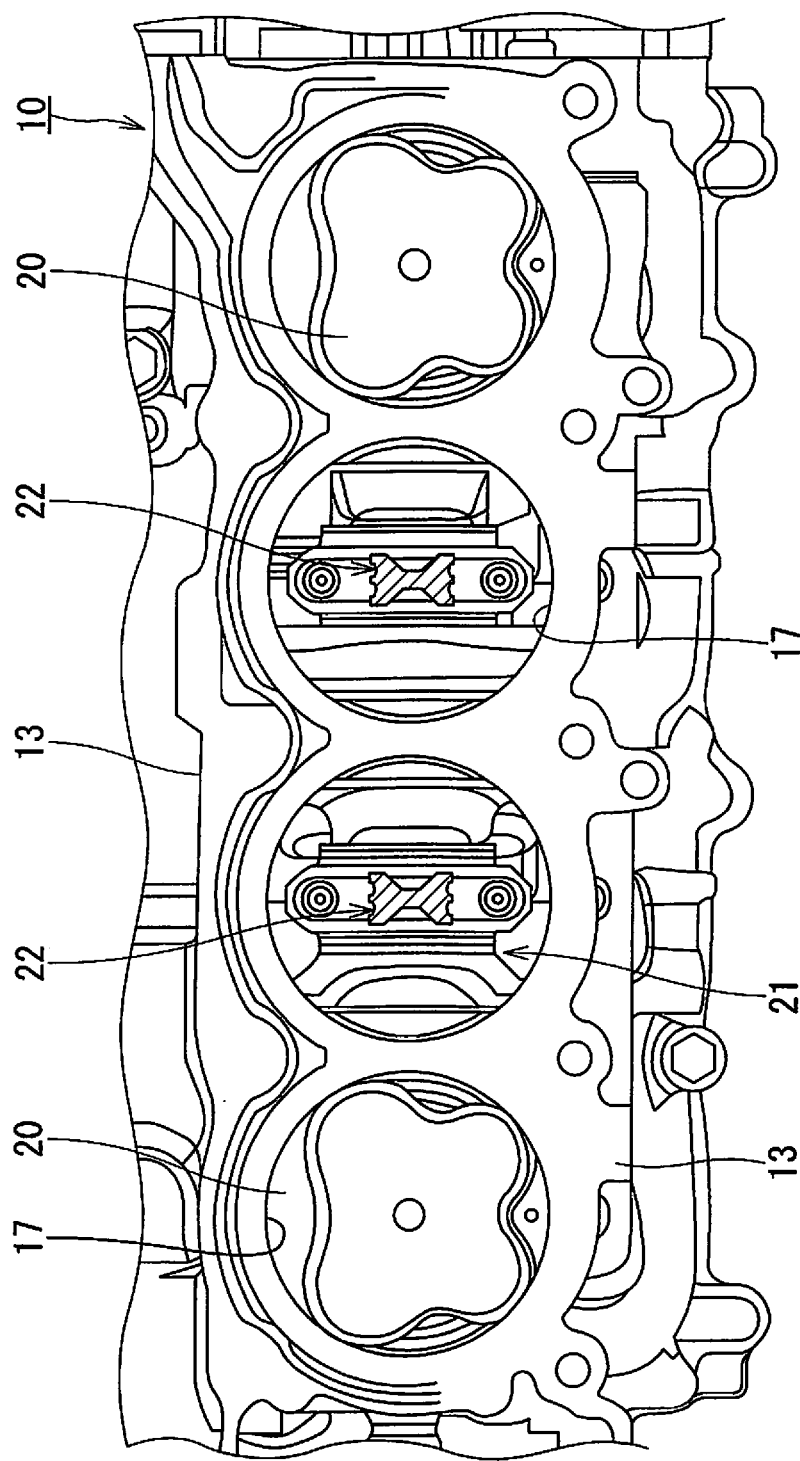
FIG. 4 is a horizontal (cross) sectional view taken along the line IV-IV in FIG. 2.

The engine 10 is a four-stroke-cycle multi-cylinder engine, for example, a parallel four-cylinder engine as shown in FIG. 2 to FIG. 4. A piston 20 performing a reciprocating motion in a cylinder 17 of the engine 10 is coupled to a connecting rod 22 at an eccentric portion of a crankshaft 21 accommodated in the crankcase 11.

According to requirement for achieving high performance and high rotational speed of the engine 10, it is required for the piston 20 and the connecting rod 22 to have light weight, and as such piston 20, a forged piston or cast piston made of aluminum alloy having high strength and excellent heat-resisting property is utilized. The piston 20 is coupled to the connecting rod 22 by means of piston pin 20a.

Figure 5:
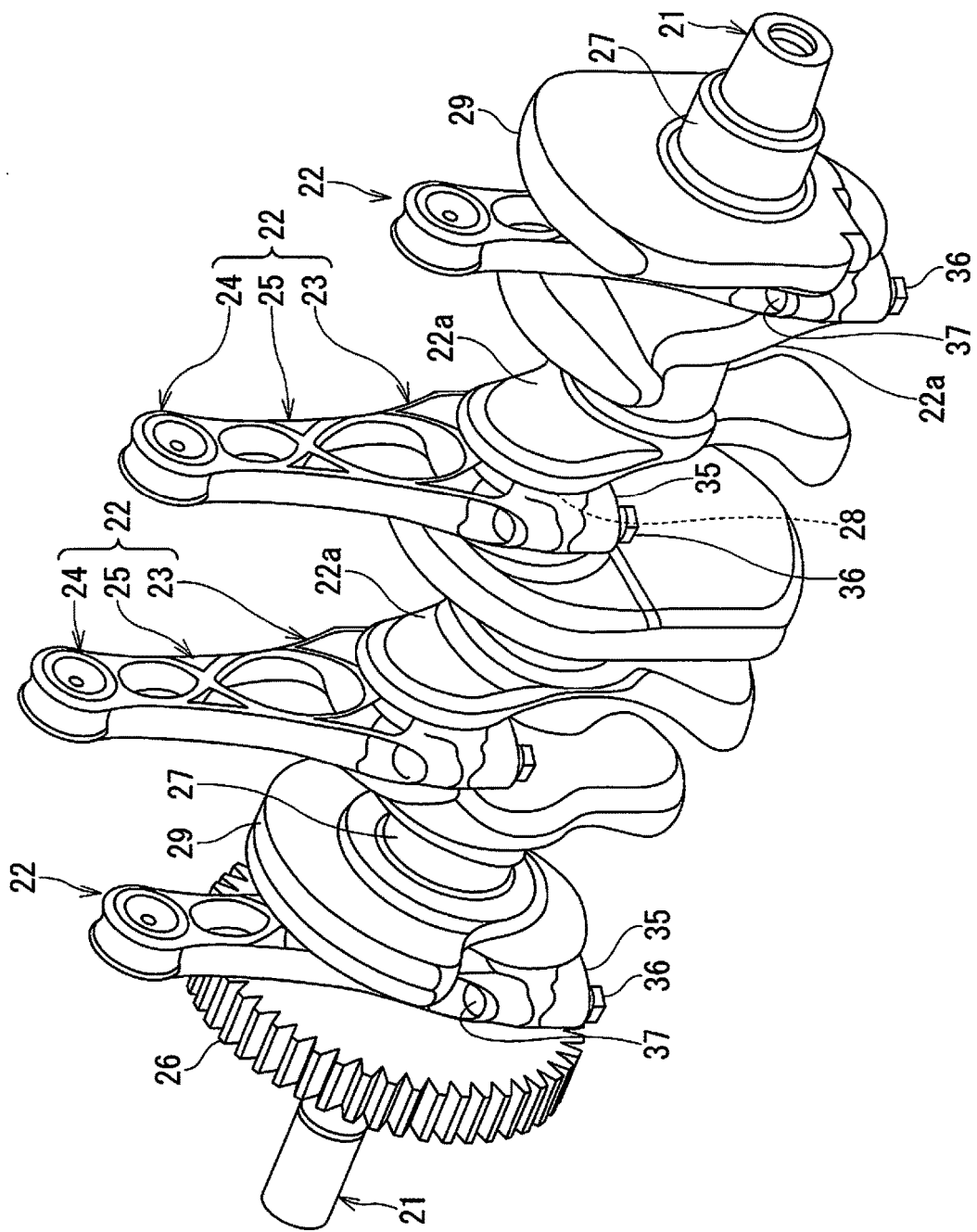
FIG. 5 is a perspective view showing an assembled state of a connecting rod and a crankshaft of the engine according to an embodiment of the present invention.
Figure 6:
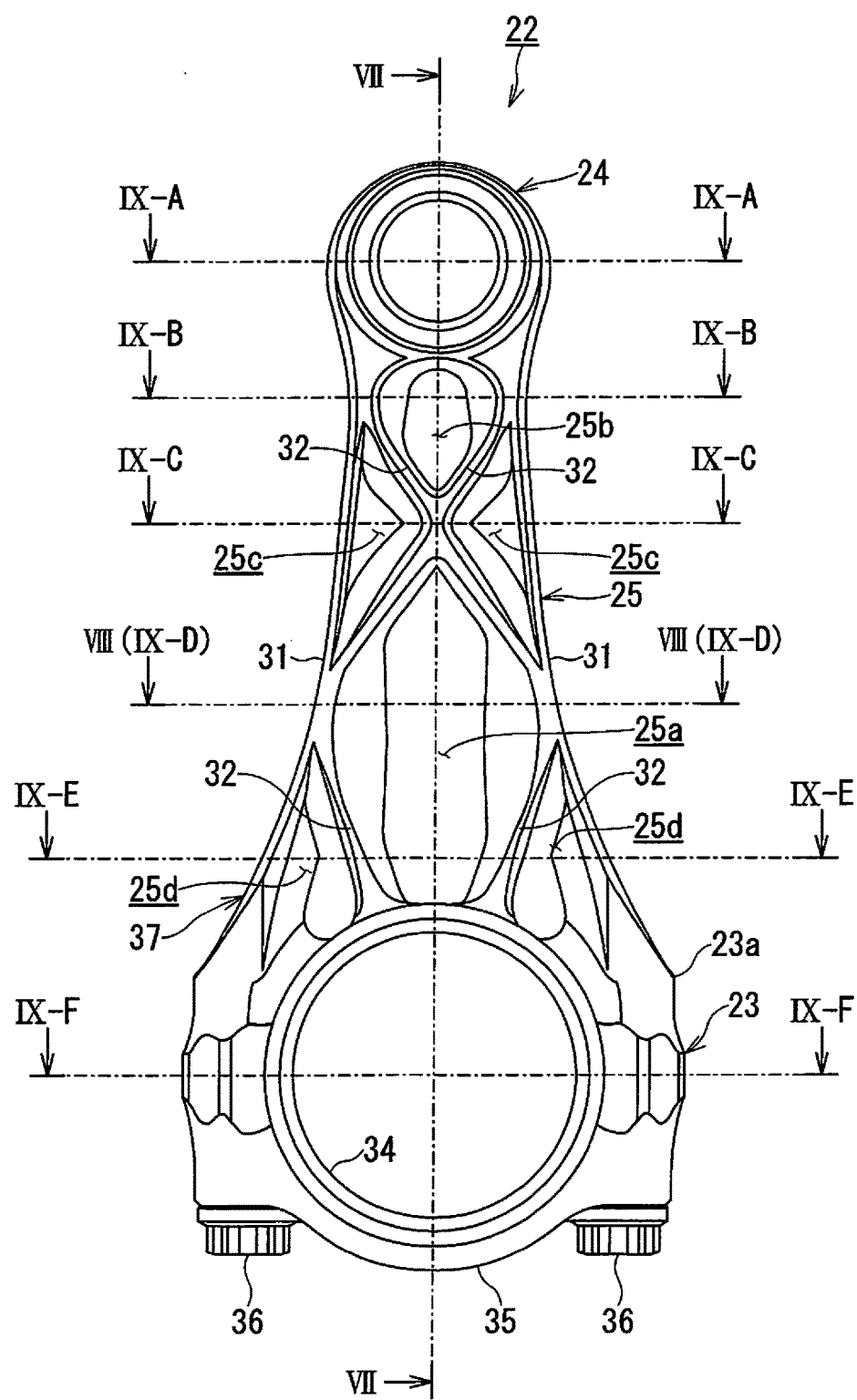
FIG. 6 is a front view an assembling type connecting rod according to the embodiment of the present invention.

The connecting rod 22 of the four-cycle engine 10 includes two types such as integral type and assembling type, in which the integral type connecting rod is mainly adopted for a single-cylinder or V-type two-cylinder engine, and the assembling type connecting rod is mainly adopted for a multi-cylinder engine such as shown in FIGS. 5 and 6.

Tension load due to inertia force by the mass of the piston 20 that is reciprocated in an exhaust stroke thereof and compression load due to the combustion are repeatedly applied, during the operation of the engine 10, to the connecting rod 22 coupled to the piston 20 by means of piston pin 20a. According to such reason, the connecting rod 22 is formed of high strength material such as chromium-molybdenum alloy steel, carbon steel or like.

Moreover, it is also required for the connecting rod 22 to have light weight because of high speed rotation of the engine, and in this requirement, the connecting rod may be formed of titanium alloy or carbon fiber.

As shown in FIGS. 5 and 6, the connecting rod 22 is composed of a large end portion 23 having a larger diameter, a small end portion 24 having a smaller diameter, and a connecting portion 25 connecting these end portions integrally.

The large diameter end portion 23 is mounted rotatably to a crank pin 21a of the crankshaft 21, and the small diameter end portion 24 is inserted into and rotatably held by the piston pin 20a of the piston 20. The connecting portion 25 of the connecting rod 22 has a plate shape having a narrow width in the axial direction of the crankshaft 21 and a wide width in the width direction perpendicular to the axial direction of the crankshaft 21, or has rod shape having rectangular cross section. The widened side surface portions of the connecting portion 25 constitute front and back surface portions of the connecting rod 22. In FIG. 5, reference numeral 26 denotes a primary drive gear acting as an engine output take-out gear.

The crankshaft 21 acts, in association with the connecting rod 22, to convert the reciprocal motion of the piston 20 to the rotational motion of the crankshaft 21. The crankshaft 21 is composed of a crank journal portion 27 constituting a central shaft section for rotation, a crank pin portion 28 of a crank web 22a to which the connecting rod 22 is attached, and a balance weight 29 for reducing vibration due to differences in weighs of the piston 20, the connecting rod 22 and the like at the time of the rotation.

Figure 7:
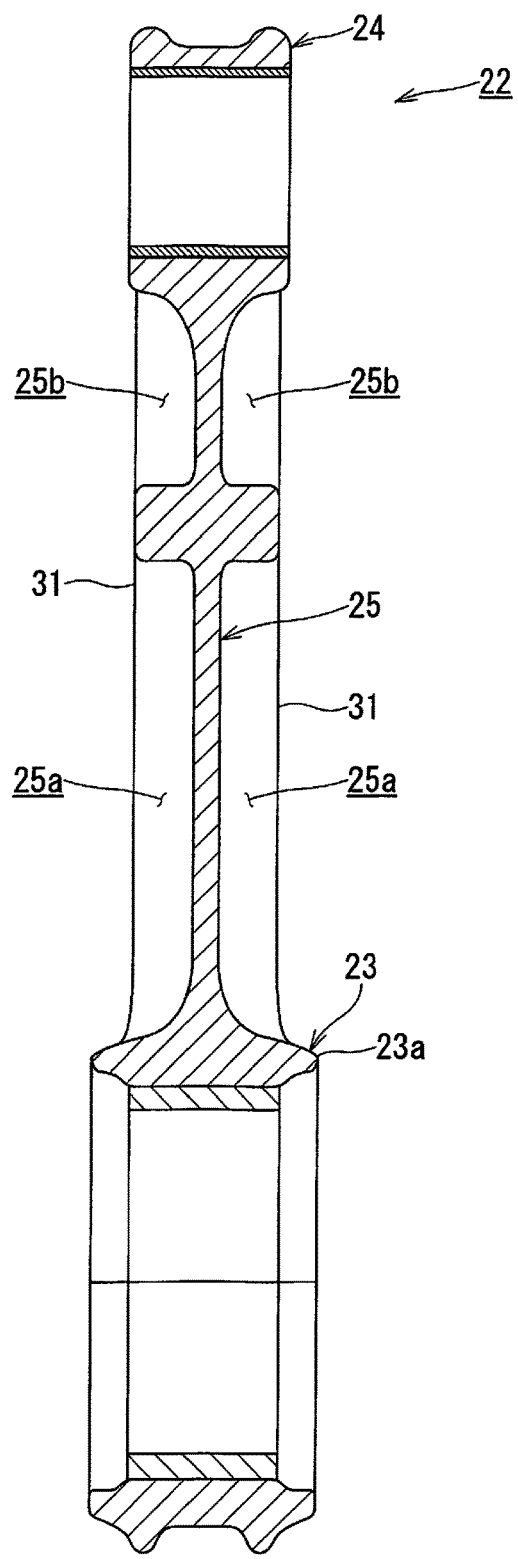
FIG. 7 is a vertical sectional view taken along the line VII-VII in the central axial direction of the connecting rod shown in FIG. 6.
Figure 8:
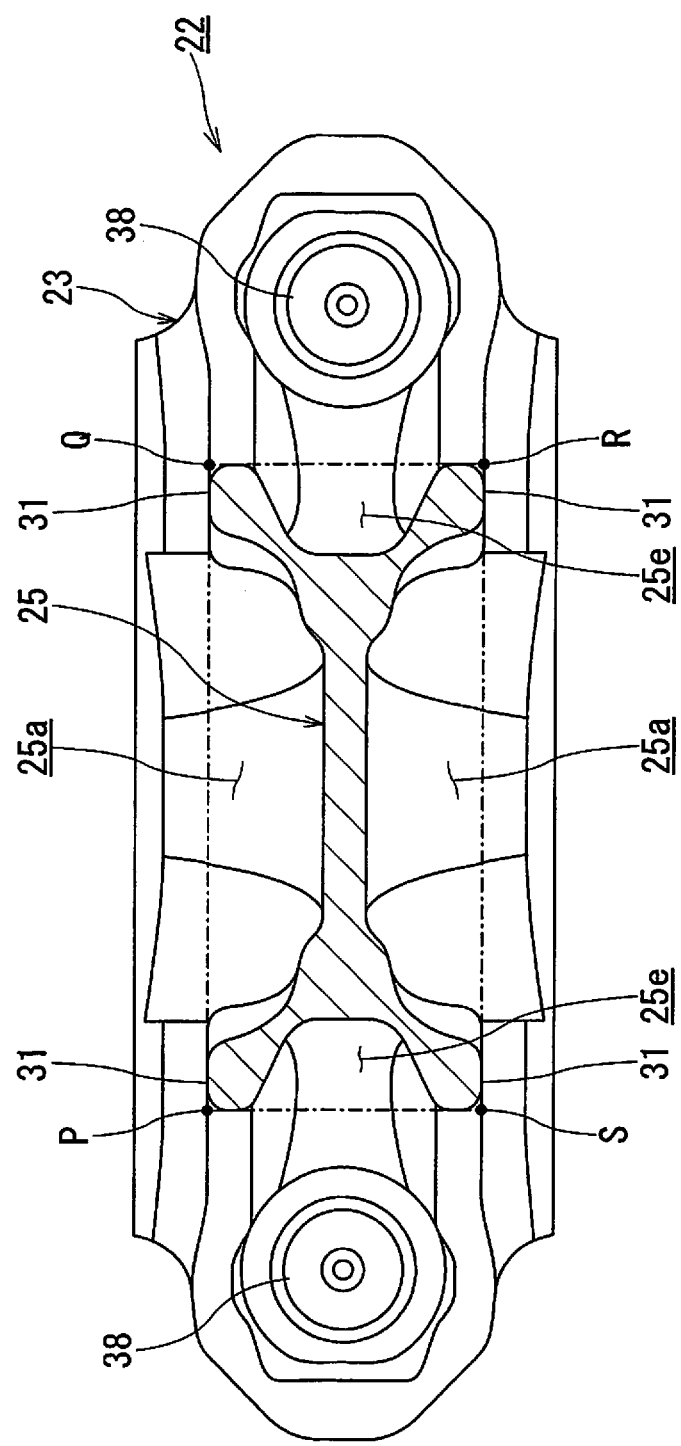
FIG. 8 is a horizontal (cross) sectional view taken along the line VIII-VIII of the connecting rod shown in FIG. 6.
Figure 9A:
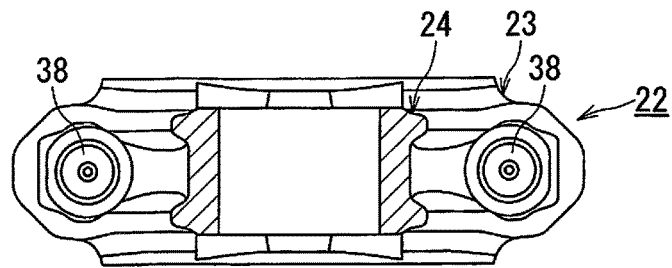
FIGS. 9A to 9F are horizontal (cross) sectional views taken along the lines IX-A to IX-F respectively shown in FIG. 6.
Figure 9B:
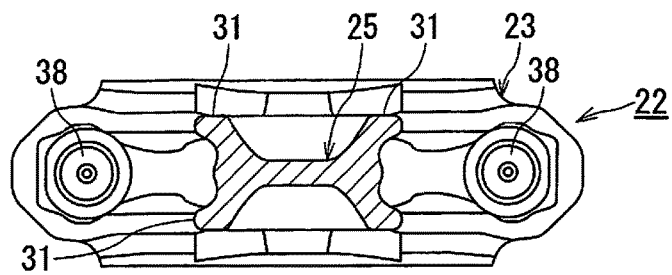
Figure 9C:
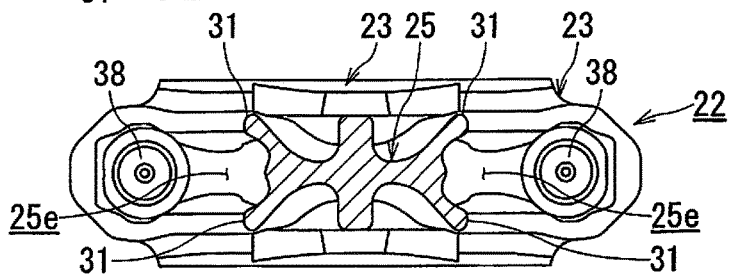
Figure 9D:
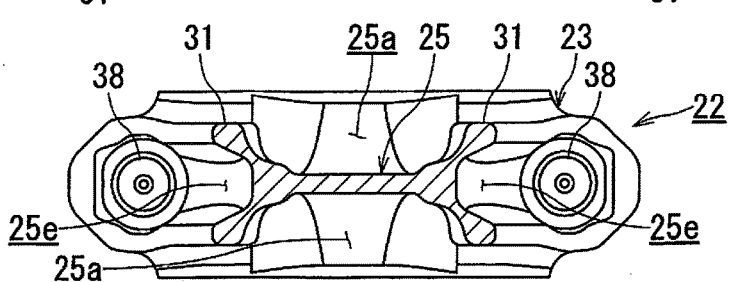
Figure 9E:
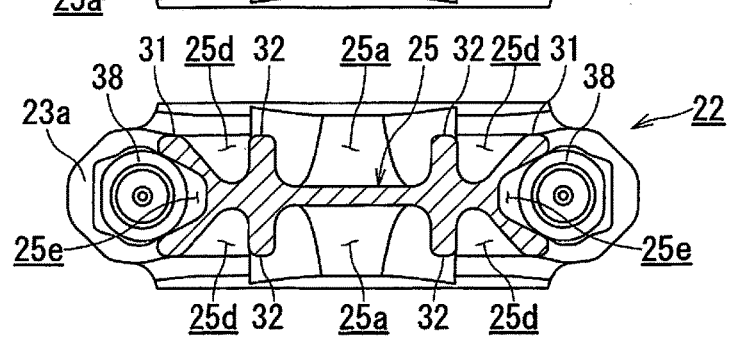
Figure 9F:
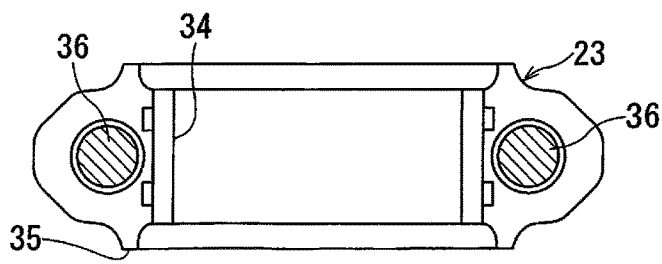

As shown in FIGS. 6 to 8, the connecting rod 22 is provided with four vertically extending reinforcing portions (vertical reinforcing portion or ribs) 31 at its connecting portion 25. These vertical reinforcing portions 31 are provided so as to project in four directions from the front and back surfaces of the wide width portion of the connecting rod 22 and so as to extend from the large diameter end portion 23 to the small diameter end portion 24 of the connecting rod 22 in the longitudinal direction along edge portions of the front and back surfaces of the connecting portion 25.

Each of the vertical reinforcing portions (ribs) 31, as shown in FIG. 6, is provided to each side edge portion of the wide width portion, and as shown in FIG. 7, the ribs 31 are provided so as to project from both thickness direction sides of the connecting portion 25 (perpendicular to the connecting width direction) as viewed in the section taken along the line VII-VII in FIG. 6 along the central axis of the connecting portion 25, through which the large diameter end portion 23 and the small diameter end portion 24 of the connecting rod 22 are connected.

Further, as shown in FIG. 8, the connecting rod 22 is formed with a plurality of recessed portions 25a to 25e such that four side surface portions are recessed with respect to four side lines of a rectangular shape formed by a virtual line connecting four end points P, Q, R, and S of the vertical reinforcing ribs 31 projecting from both side edge portions of the connecting portion 25, in view of the section taken along the line VIII (IX-D) in FIG. 6 in a perpendicular surface of the central axis of the connecting portion 25.

The vertical reinforcing ribs 31 of the connecting rod 22 are provided so as to oppose to both the side edge portions (separated in the width direction from the central axis) of the plate-shaped connecting portion 25 of the connecting rod 22, and the connecting portion 25 is formed with the recessed portions by depressing portions between the paired vertical reinforcing ribs 31. Accordingly, the weight of the connecting portion 25 can be reduced with the rigidity in the bending direction being maintained. Further, in the present embodiment, although the recessed portions are formed to both side surfaces of the front and back surface portions of the connecting rod 22, only one recessed portion may be formed in one side surface portion thereof.

In addition, as described above, the recessed portions 25a to 25e are formed integrally by depressing the respective lines forming the rectangular shape formed by the virtual line connecting the four end points P, Q, R, and S of the vertical reinforcing ribs 31, and each of the recessed portions is opened outward, and accordingly, the connecting rod 22 is superior in punch-out performance in the forging or casting process, or forging process after casting process, so that the connecting rod 22 can be manufactured by various workings, and hence, manufacturing method or process superior in productivity can be selected for manufacturing the connecting rod.

Furthermore, the connecting portion 25 of the connecting rod 22 is also formed integrally, to the front and back surface portions thereof, with obliquely extending reinforcing portions (oblique reinforcing ribs) 32 so as to extend obliquely with respect to the central axis (longitudinal) direction of the connecting portion 25. According to the formation of such oblique reinforcing ribs 32 to the connecting portion 25 of the connecting rod 22, the rigidity of the connecting portion in the twisting direction can be improved.

Both the end portions of each of the oblique reinforcing ribs 32 are connected to the vertical reinforcing ribs (vertical reinforcing portions) 31 on both the edge portions of the connecting portion 25 of the connecting rod 22 as integral structure. By connecting the oblique reinforcing portions (ribs) 32 to the vertical reinforcing portions (ribs) 31 so as to provide a lattice-shaped reinforcing structure, the connecting rod 22 can produce the increased rigidity in both the bending and twisting directions.

At a time when the connecting rod 22 are worked by forging process or casting process, or forging process after casting process, the vertical reinforcing portions 31 and the oblique reinforcing portions 32, each in form of rib, are formed to the front and back side surfaces of the connecting portion 25 of the connecting rod 22. Furthermore, a plurality, six, for example, of the recessed portions 25a to 25d are also formed to the front and back side surfaces of the connecting portion 25, and recessed portions 25e formed to the both the side edge portions of the wide width side surface thereof. According to the arrangement of these recessed portions 25a to 25e, the front and back side surfaces and the wide width side surface of the connecting portion 25 of the connecting rod 22, the thickness-reduced structure is provided to the connecting rod 22, thereby realizing the light weight structure with the mechanical and physical structures being maintained, and being superior in anti-buckling performance. Thus, the connecting rod 22 having light weight and being suitable for the engine having high rotation speed and improved output power can be provided.

Moreover, the two oblique reinforcing portions (ribs) 32 formed to the connecting portion 25 in a crossing form (approximately X-shape) on the side surface of the connecting portion 25 as shown in FIGS. 6 and 9. Since such oblique reinforcing portions 32 are formed in two pairs on the front and back side surfaces of the connecting portion 25 each in the crossing arrangement, the paired two oblique reinforcing portions 32 act in cooperation with each other to the normal and reverse twisting directions of the connecting portion 25 of the connecting rod 22, and accordingly, the rigidity thereof can be further enhanced.

Incidentally, the large diameter end portion of the connecting rod 22 is provided with a half-timber-shaped bearing cap 35, acting as a holder, to be separable from a big end portion 23a of a fixing boss. The large diameter end portion 23 of the connecting rod 22 acts to integrally fasten the bearing cap 35 to the connecting rod body 37 with a fixing bolt (connecting rod bolt) 36 while tightly contacting a large diameter bearing 34. The connecting rod body 37 includes the connecting portion 25 integrally with the big end portion 23a of the fixing boss.

As described above, in the large diameter end portion 23, the bearing cap 35 acting as a holder is constructed to be separable from the fixing boss (big end portion 23a) of the connecting rod body 37, and the bearing cap 35 is detachably fastened to the big end portion 23a of the connecting rod body 37 by means of the fixing bolt 36, thus constituting a collapsible (assembling-type) connecting rod 22. In FIGS. 8 and 9, reference numeral 38 denotes a nut screw-engaged with the connecting rod bolt 36 as fixing bolt.

Further, as shown in FIG. 6, in the connecting rod 22, the vertical reinforcing portion 31 of the connecting portion 25 extends from the connecting portion 25 toward the side portion of the big end portion 23a of the large diameter end portion 23 and integrally coupled thereto. Furthermore, the oblique reinforcing portion 32 connects the vertical reinforcing portion 31 and the big end portion 23a. According to such connecting structure, the connecting rod 22 is enhanced in its mechanical and physical strengths.

Moreover, in the connecting rod 22, on one side, the rib-shaped vertical reinforcing portion 31 and the rib-shaped oblique reinforcing portion 32 extend to the big end portion (fixing boss portion) 23a of the large diameter end portion 23 and are formed to be integrally, and on the other side, the rib-shaped vertical reinforcing portion 31 is integrally coupled to the end portion of the rib-shaped oblique reinforcing portion 32 on the small diameter end side 24. Accordingly, the connecting rod 22 constitutes an integral structure provided with the large diameter end portion 23, the small diameter end portion 24 and the central connecting portion 25 through which both the end portions 23 and 24 are connected, whereby the connecting rod 22 having stable buckling performance, anti-bending strength and anti-twisting strength can be provided, and hence, according to the present embodiment, the collapsible (assembling-type) connecting rod 22 having high rigidity and light weight can be also provided.

Furthermore, the connecting portion 25 of the connecting rod 22 has the plate shape having a wide width in the width direction perpendicular to the axial direction of the crankshaft 21, or rod shape having rectangular cross section, and the rib-shaped vertical reinforcing portions 31 are formed to both the wide side edge portions so as to extend in the longitudinal direction to be widened from the connecting portion 25 toward the big end portion (fixing boss portion) 23a of the large diameter end portion 23 and coupled to the side portions of the big end portion 23a.

As shown in FIGS. 6 and 8, the vertical reinforcing portion 31 of the connecting portion 25 of the connecting rod 22 extends over the extension of the center line of the connecting rod bolt 36 so as to be widened outward and is connected to the side portion of the big end portion 23a of the large diameter end portion 23. According to such extending arrangement, the load to be applied to the large diameter end portion 23 is received as reduced surface load, thus being advantageous.

Furthermore, as shown in FIG. 7, in the vertical sectional view along the center axis direction, the vertical reinforcing portions 31 are connected respectively to the large diameter end portion 23 and the small diameter end portion of the connecting portion 25, and the front and back side surfaces are formed with recessed portions with reduced thickness, so that the total weight of the connecting portion 25 can be reduced with the improved rigidity in the bending direction being maintained.

In addition, in the connecting portion 25 of the connecting rod 22, the vertical reinforcing portions 31 extending in the longitudinal direction opposing to both the end edge portions of the widened front and back side surfaces are mutually coupled through the oblique reinforcing portions 32. These rib-shaped vertical and oblique reinforcing portions 31 and 32 constitute the lattice-shaped structure and to these rib-shaped vertical and oblique reinforcing portions 31 and 32 are formed with a plurality of, for example, six recessed portions 25a to 25d, respectively, thereby reducing the weight of the connecting rod so as to provide the light weight structure, which leads to realization of engines having high speed rotation and high output power.

The formation of the oblique reinforcing portion 32 arranged so as to connect the vertical reinforcing portions 31 extending in the longitudinal direction along the both the end edge sides of the front and back side surfaces of the connecting portion 25 of the connecting rod 22, so that the rigidity in the bending direction and twisting direction can be enhanced.

In any event, the compression load due to the combustion and the tension load due to inertia of the reciprocal mass in the exhaust stroke are applied to the connecting rod 22 of the engine 10 during the engine operation or running period. The tension load is in proportional to the square of the rotation speed, the mass of the piston assembly, and the reciprocal mass of the connecting rod 22, and hence, it is known that such tension load becomes large by the compression load in the higher speed operation than predetermined speed rotation. Because of such reason, in order to achieve the engine high speed and high power operation, it has been required to make light the weight of the piston 20, the connecting rod 22, and the crankshaft 21 as well as to realize of the high strength thereof. In addition, it has also been required for the connecting rod 22 to have the light weight and improve the anti-buckling performance, as well as the improvement in the rigidity to the bending and twisting forces.

In the connecting rod 22 of the structure described above, the vertical reinforcing portions (ribs) 31 extending in the longitudinal direction from the large diameter end portion 23 to the small diameter end portion 24 are formed integrally to both the side edge portions on the front and back side surface portions of the connecting portion 25, and the oblique reinforcing portion (rib) 32 is connected at both the end portions to the vertical reinforcing portions 31, thereby providing the reinforcing structure which results in the enhancement of the rigidity of the connecting rod 22 in both the bending and twisting directions.

Moreover, a plurality of the recessed portions 25a to 25d and 25e are formed to the front and back side surfaces of the connecting portion 25, respectively, in the space surrounded by the rib-shaped vertical and oblique reinforcing portions 31 and 32. Since these recessed portions are formed as thickness-reduced portions, the weight of the connecting rod 22 can be reduced.

According to the structure of the connecting rod 22 described above, even if the connecting portion 25 thereof has a plate-shape structure or a rectangular shape in section, since both the end portions of the vertical reinforcing portions 31 are connected to the oblique reinforcing portion 32 at both the side edge portions on the front and back side surfaces thereof, and hence, even if the connecting rod 22 has a light weight, the improved rigidity in the bending and twisting directions, and therefore, the connecting rod 22 suitable for the high speed and high power operation of the engine can be provided. Further, since the engine 10 having high power provides a high compression ratio, it is required for the connecting rod 22 to have light weight and high rigidity.

Furthermore, since two oblique reinforcing portions (ribs) 32 are disposed so as to provide an approximately X-shape crossing on the front and back side surface portions of the connecting portion 25 of the connecting rod 22, the rigidity of the connecting rod 22 can be enhanced in associated operation of these oblique reinforcing portions 32 against the normal and reverse twisting forces, and the rigidity thereof can be further increased by the lattice structure of the integral connection of the oblique reinforcing portions 32 to the vertical reinforcing portions 31 at both the end portions thereof.

Still furthermore, since the vertical reinforcing portions 31 and the oblique reinforcing portions 32, both being formed as rib-shaped projections, of the connecting portion 25 are arranged so as to project in the same direction to be opened, the punching-out performance at the forging and/or casting molding operation of the connecting rod 22 can be appropriately maintained, which leads the preferred moldability.

According to the present embodiment of the structures and characters mentioned above, the following advantageous effects will be achieved.

In the present embodiment, the rib-shaped vertical reinforcing portions 31 are formed to both the side edge portions of the front and back side surface portions of the connecting portion 25 of the connecting rod 22 so as to extend in the longitudinal direction from the small diameter end portion to the large diameter end portion of the connecting portion 25. Accordingly, the rigidity in the bending direction of the connecting rod 22 can be improved. Moreover, these vertical reinforcing portions are formed to both the front and back side surface portions (widened side surface portions) of the connecting portion 25, respectively, the rigidity in the bending direction of the connecting rod 22 can be further improved.

Furthermore, according to the present embodiment, since the rib-shaped oblique reinforcing portions 32 are formed to the front and back side surfaces of the connecting portion 25 so as to extend obliquely with respect to the center axis of the connecting rod 22, the rigidity in the twisting direction of the connecting portion 25 can be improved.

Since both the end portions of the oblique reinforcing portions 32 are connected respectively to both end portions of the vertical reinforcing portions 31 are respectively connected to each other, the rigidities in the bending direction as well as the twisting direction can be improved.

Moreover, since the two of the oblique reinforcing portions cross each other in an X-shape on each side surface portion of the connecting portion so as to provide the lattice-shaped structure, the rigidity against the twisting force in the normal and reverse direction can be enhanced in associated function of the two oblique reinforcing portions.

Still furthermore, in the present embodiment, the space surrounded by the vertical reinforcing portions 31 and the oblique reinforcing portion 32 both formed in the rib-shape on the front and back side surfaces of the connecting portion 25 of the connecting rod 22 is formed as a recessed portion reduced in thickness, and a plurality of such recessed portions are formed, so that the connecting rod 22 can be formed with reduced light weight, which contributes to the production of the connecting rod suitable for high speed and high power operation of the engine.

Still furthermore, the plural recessed portions formed by the rib-shaped vertical and oblique reinforcing portions in the front and back side surfaces of the connecting portion 25 of the connecting rod 22 are formed to be widened outward, so that the punching-out operation at the forging and/or casting operation can be preferably performed, thereby improving the productivity of the connecting rod.

Still furthermore, the vertical and oblique reinforcing portions 31 and 32 extend to the side surfaces of the fixing boss portion (big end portion) 23a of the large diameter end portion 23 of the connecting rod 22 and are connected thereto. The vertical reinforcing portions 31 are provided to be opened (widened) outwardly toward the large end portion side 23 so as to straddle the extension of the center line of the fixing bolt and connected to the side portions of the big end portion 23a. According to such arrangements of the vertical and oblique reinforcing portions, the load applied to the large diameter end portion 23 of the connecting rod 22 is received as a reduced surface load, thus being advantageous.

Accordingly, as described hereinabove, in the connecting rod 22 of the engine 10 of the present embodiment, by improving the design in shape or arrangement of the rib-shaped vertical reinforcing portions 31 of the connecting portion 25 of the connecting rod 22, the rigidity thereof in there bending and twisting directions can be enhanced, and hence, the connecting rod 22 having light weight and high rigidity can be provided.

Hereinabove, although the present embodiment was explained with reference to a parallel multi-cylinder engine of a motorcycle, the engine may be applicable to other vehicles such as three-wheeled vehicle, four-wheeled vehicle, outboard motor, snowmobile and the like vehicles, and two-stroke cycle engine may be also applicable in place of four-stroke cycle engine. In addition, the connecting rod 22 of the present embodiment may be also applicable to any type of the engines such as single cylinder engine or multi-cylinder engine including V-type engine, parallel-type engine, square-type four-cylinder engine and the like.

Moreover, an integral type connecting rod may be also replaced for a collapsible (assembling-type) engine.

Consequently, it is to be noted that the present invention is not limited to the embodiments described above as preferred examples, and many other changes, modifications, and alternations may be made without departing from the sprits of the present invention and scope of the appended claims.

What is claimed is:

1. A connecting rod of an engine comprising:
    a large diameter end portion mounted to a rotatable crank of a crankshaft of an engine;
    a small diameter end portion into which a rotatable piston pin is inserted and which supports the piston pin; and
    a connecting portion connecting the large diameter end portion and the small diameter end portion at longitudinal end portions thereof,
    wherein the connecting portion includes a plate-shape widened in a width direction thereof,
    wherein the plate-shape is positioned perpendicular to a center axis of the crank shaft,
    wherein the connecting portion includes:
        four vertical reinforcing portions projecting in four directions so as to extend in a longitudinal direction of the connecting rod from the small diameter end portion to the large diameter end portion, and
        a plurality of recessed portions positioned such that side surface portions of the connecting portion and portions of the connecting portion along a center axis of the connection portion are recessed with respect to the vertical reinforcing portions.

2. The connecting rod of claim 1, wherein the connecting portion includes oblique reinforcing portions extending in the longitudinal direction of the connecting portion so as to cross each other.

3. The connecting rod of claim 2, wherein the vertical reinforcing portions and the oblique reinforcing portions are rib members.

4. The connecting rod of claim 2, wherein each of the oblique reinforcing portions has both end portions thereof connected to the vertical reinforcing portions positioned to both side edge portions of the respective connecting portion.

5. The connecting rod of claim 2, wherein two of the oblique reinforcing portions cross each other in an X-shape on a side surface portion of the connecting portion.

6. The connecting rod of claim 5, wherein the side surface portion of the connecting portion includes a reinforced lattice structure formed by the vertical reinforcing portions and the oblique reinforcing portions.

7. The connecting rod of claim 1, wherein the vertical reinforcing portions connected to side portions of the large diameter end portion are widened from the connecting portion toward the large diameter end portion.

8. The connecting rod of claim 7, wherein the large diameter end portion is dividable by a detachable holder,
    wherein the large diameter end portion is integrally fastened by a fixing bolt to a fixing boss portion of the holder,
    wherein the vertical reinforcing portions extend to side portions of the fixing boss portion and are connected thereto, and
    wherein the vertical reinforcing portions extend to be widened toward an outside of an extension of a center axis of the fixing bolt and are connected to the side portions of the fixing boss portion of the holder.

* * * * *